April 21, 1964 V. H. VODRA 3,129,972
AUTOMOBILE FLOOR MAT
Filed Feb. 12, 1962 3 Sheets-Sheet 1
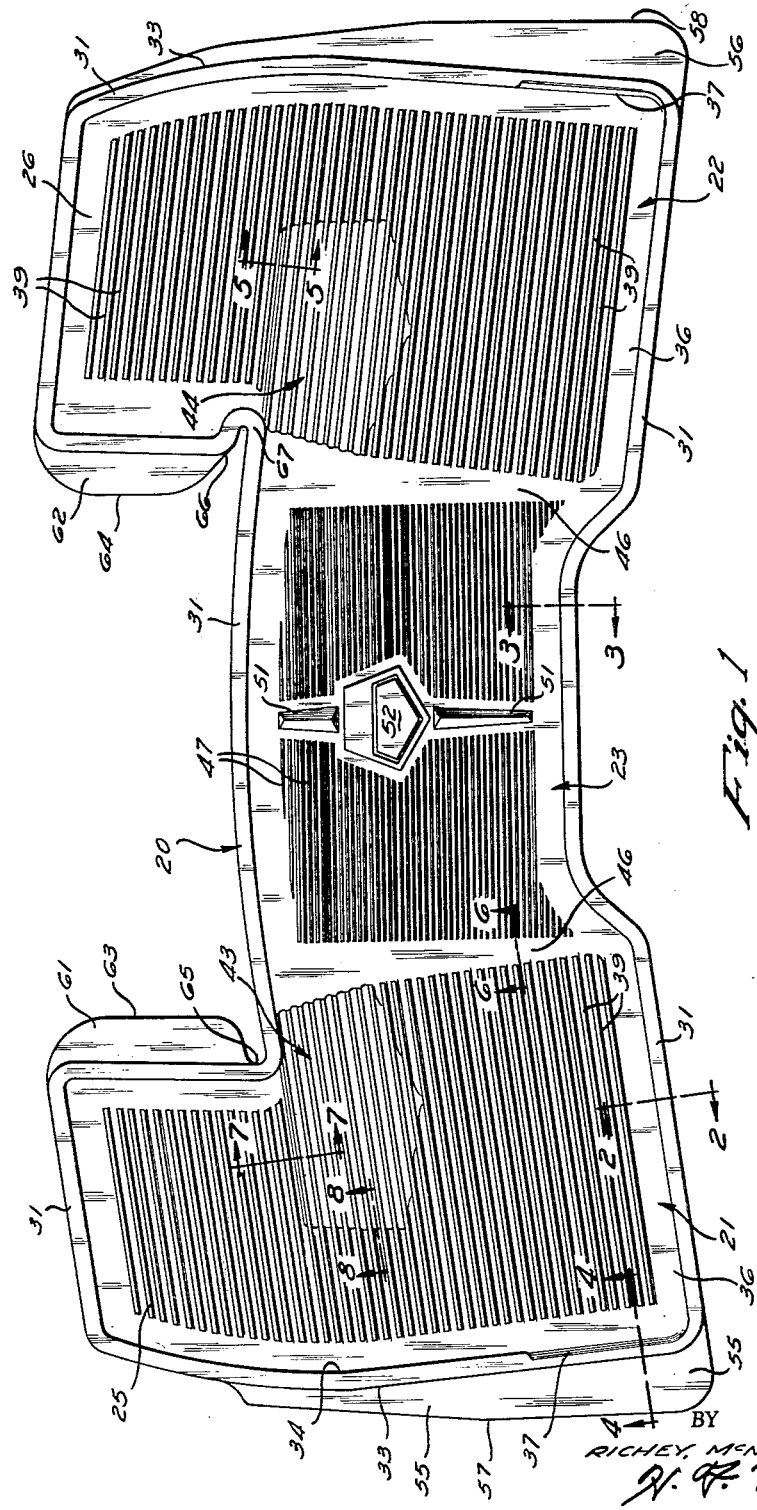
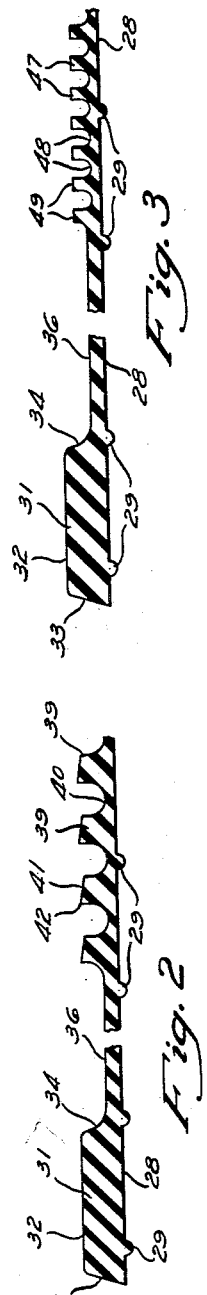
INVENTOR.
VICTOR H. VODRA
BY RICHEY, McNENNY & FARRINGTON
ATTORNEYS

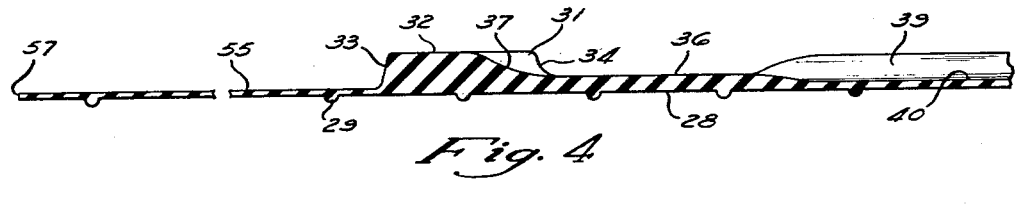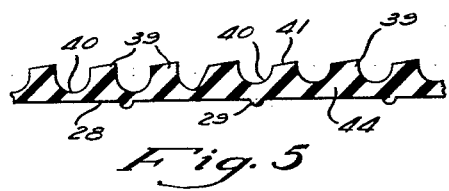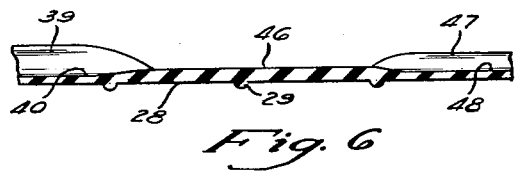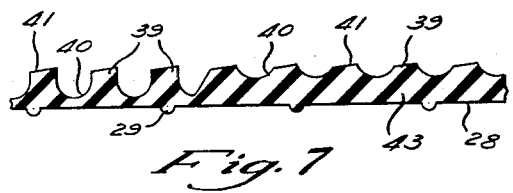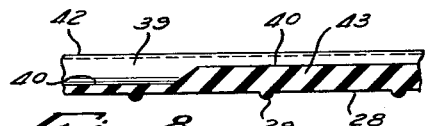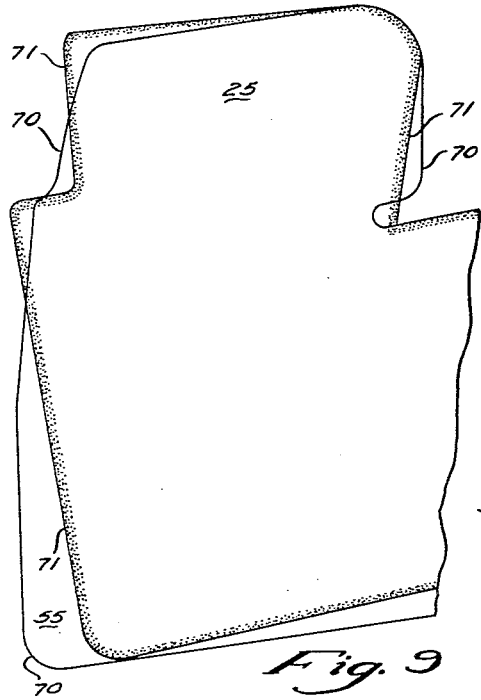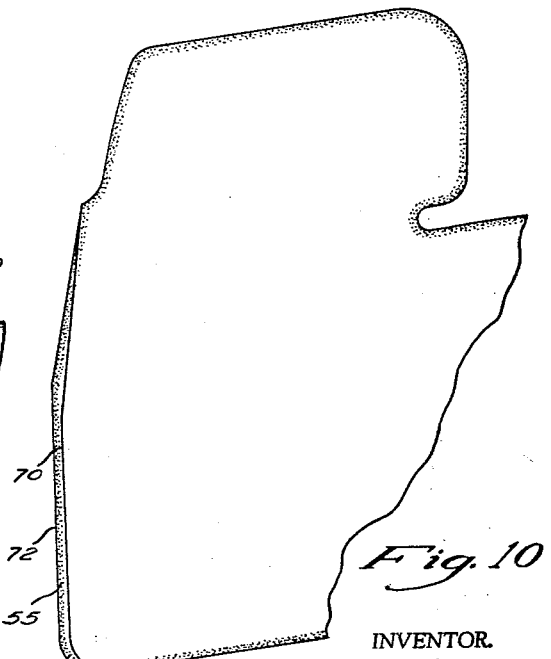

April 21, 1964     V. H. VODRA     3,129,972
AUTOMOBILE FLOOR MAT
Filed Feb. 12, 1962     3 Sheets-Sheet 3
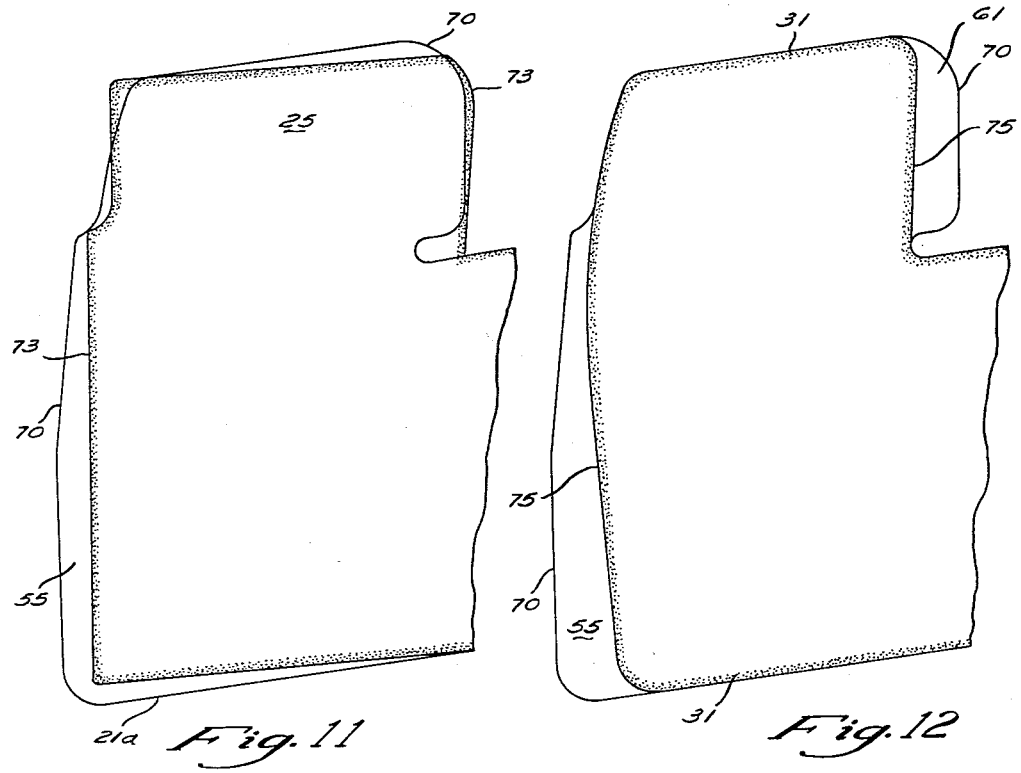
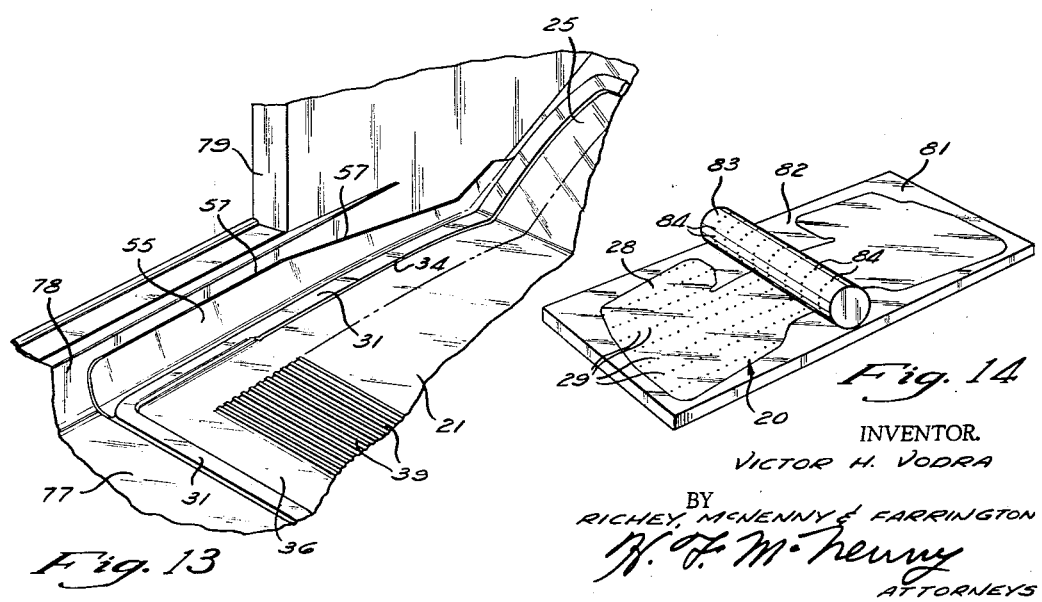
INVENTOR.
VICTOR H. VODRA
BY RICHEY, McNENNY & FARRINGTON
ATTORNEYS United States Patent Office 3,129,972
Patented Apr. 21, 1964

3,129,972
AUTOMOBILE FLOOR MAT
Victor H. Vodra, 715 Kieffer St., Wooster, Ohio
Filed Feb. 12, 1962, Ser. No. 172,741
5 Claims. (Cl. 296—1)

This invention relates generally to automobile floor mats and more particularly to flexible fitted floor mats adapted to be placed over the standard equipment carpeting at the front seat of the automobile in order to provide a non-skid surface and protect the factory installed carpeting from dirt and wear.

The principal object of this invention to provide a universal automobile floor mat of the accessory type for covering the factory installed carpeting in automobiles which will give a good fit and substantially cover the entire floor area in front of the front seat in a number of different makes of automobiles of different sizes.

Another object of this invention is to provide a universal automobile floor mat of the type set forth in the preceding object which will substantially cover the floor of a fully sized automobile and can be fitted to a smaller size automobile without any cutting or buckling of the mat.

Another object of this invention is to provide an automobile floor mat of the type set forth in the preceding objects which has a peripheral dam which extends in unbroken fashion around the main floor area of the mat and is spaced inward from the outer edge at certain points so as to be substantially flat on the floor of smaller size automobiles and prevent water and dirt on the surface of the mat from spilling over the edge of the mat on to the carpeting beneath.

Another object of this invention is to provide an automobile floor mat having upwardly projecting ribs which extend transversely across the mat and have upper surfaces sloping downward toward the front of the automobile to give greater traction to forward movement of a passenger's feet than to rearward movement.

Still another object of this invention is to provide an automobile floor mat of the type set forth in the preceding objects which is easy to clean, attractive in appearance, and which lends itself to manufacture at relatively low cost.

All of the foregoing objects are accomplished in the floor mat of this invention in which the mat has a peripheral dam forming an outline generally conforming to the floor of the smallest size car which the mat is intended to fit so that when the mat is in place, the dam lies substantially flat on the floor and projects above the surface of the mat to contain water and dirt within the confines of the mat. Outwardly of the peripheral dam, the mat is provided with thin, flexible flap portions located to extend over the floor of an automobile of larger size and provide a protective covering over the portion of the carpeting which extends outwardly beyond the peripheral dam. In one embodiment, the peripheral dam has a flattened upper surface and sidewalls rising substantially vertically from the floor to deflect water and dirt back toward the interior of the mat, and the upper surface of the mat has transverse ribbing which is spaced away from the peripheral dam to form a smooth margin or channel in which the dirt can be collected from the grooves between the ribs. The inner sidewall of the peripheral dam adjacent the door on either side is changed in contour to provide a gradually sloping inner surface which is conducive to permitting the water and dirt to be brushed over the top edge of the dam and out of the door of the automobile. Another feature of a preferred embodiment of the floor mat is the ribbing on the surface which extends laterally across the automobile and has top surfaces which slope downwardly and forwardly away from the rear edge to provide greater gripping action against forward motion than rearward motion so that the passenger's feet may easily slide to the rear of the mat with relatively little friction, while the ribs provide considerably greater friction against forward movement of the feet toward the dashboard to provide better footing and a greater sense of security to the passengers.

Further objects and advantages of this invention will readily become apparent to those skilled in the art upon a more complete understanding of a preferred embodiment of the invention which is shown in accompanying drawings and described in detail hereinafter.

In the drawings:

FIG. 1 is a top plan view of the preferred embodiment of an automobile floor mat according to the present invention;

FIG. 2 is a cross-sectional view through the peripheral dam and transverse ribs taken on line 2—2 of FIG. 1;

FIG. 3 is a cross-sectional view through the peripheral dam and the center ribs taken on line 3—3 of FIG. 1;

FIG. 4 is a cross-sectional view taken on lines 4—4 of FIG. 1 showing the peripheral flap and the portion of the peripheral dam allowing dirt on the mat to be easily swept over the dam;

FIG. 5 is a cross-sectional view taken on line 5—5 of FIG. 1;

FIG. 6 is a cross-sectional view taken on line 6—6 of FIG. 1;

FIG. 7 is a cross-sectional view taken on line 7—7 of FIG. 1;

FIG. 8 is a cross-sectional view taken on line 8—8 of FIG. 1;

FIGS. 9, 10, 11, and 12 are layout views showing the comparable outlines of the floor mat of FIG. 1 and those of floor mats adapted to precisely fit the floor of various makes and sizes of automobiles;

FIG. 13 is a fragmentary perspective view showing the fit of the floor mat of FIG. 1 in a smaller automobile such as that employing the floor mat of FIG. 12; and FIG. 14 is a perspective view illustrating a method of forming the textured underside of the floor mat.

As is shown most clearly in the plan view of FIG. 1, the floor mat indicated generally at 20 includes a left side panel 21 and a right side panel 22 spaced apart by center panel 23. When the floor mat is positioned on the floor in front of the front seat of an automobile, the left side panel 21 lies flat on the floor with the forward portion 25 slanting upward beneath the pedals. Likewise, the right hand side 22 has a forward portion 26 adapted to lie on the sloping portion of the floorboard, while the center panel 23 is adapted to fit over the hump formed by the transmission and drive shaft housing.

The floor mat 20 has a generally smooth underside 28 which may be provided with an array of small button like projections 29 in the manner described in greater detail hereinafter. These projections or buttons 29 serve to space the underside of the floor mat slightly away from the rubber mat or carpeting beneath to allow air circulation and prevent mildew, as well as to prevent slipping between the floor mat and the carpeting which is firmly secured to the automobile floor.

On the upper surface of the floor mat a raised peripheral dam 31 extends unbrokenly around the entire periphery of the mat to define an area which is shaped to be flat on the floor of even a relatively small size automobile. In the preferred embodiment, as shown in FIGS. 2 and 3, the peripheral dam 31 is formed with a flat top surface 32 which intersects a sloping outer surface 33 and inner side 34 which rises upward from a smooth margin portion 36 on the inside of peripheral dam 31. Inner side 34 is formed as a radiused fillet having a radius approximately equal to the height of the dam top surface 32 above the margin portion 36. The rear portion of the peripheral dam 31 along each side has the inner side formed into a ramp or sloping portion 37 (see FIG. 4) which forms a gradual rise from smooth margin 36 and blends into the top surface 32. This sloping portion 37 allows dirt to be brushed easily over the top of the peripheral dam so that it may be swept out of the doors of the car. The concave or radiused inner side 34 of the peripheral dam 31 prevents dirt from being easily forced over the edge, since its curved shape tends to deflect dirt back into the interior of the mat. Any other desired form may be used with the broader feature of this invention.

As another feature which may be used with the foregoing or in other mats the side panels 21 and 22 are provided with parallel transverse ribs 39 (see FIGS. 2, 5 and 7) which rise above the top surface 24 to provide wear and traction surfaces for the passenger's and driver's feet. These ribs 39 are generally spaced away from the peripheral dam 31 by the smooth margin 36 so that dirt and water may flow out from between the ribs into the margin 36 for easy removal over the sloping portion 37 of the peripheral dam. The transverse ribs 39 are spaced apart by U-shaped grooves 40 and have top surfaces 41 which slope downward and forward toward the front of the mat leaving a rear edge 42 having an acute angle for gripping against the shoes of the passengers. The sloping top surface 41 allows the passenger's feet to be drawn backward toward the seat relatively easily while providing relatively high gripping force by the rear edge 42 against forward movement of the feet. This allows the passengers to brace themselves more readily without hindering normal movement of the feet in a rearward direction.

In order to provide greater stiffness and wear resistance, reinforced areas 43 and 44 may be provided on the left and right panels 21 and 22, respectively, in the area where the feet will generally rest. These reinforced area 43 and 44 are formed by having the U-shaped grooves 40 of lesser depth in that area than in the surrounding areas, while the top surfaces 41 of the transverse ribs 39 are of uniform height over the entire extent of these panels. Preferably, the reinforced area 43 (see FIG. 7) on the driver's side is made somewhat heavier than area 44 (see FIG. 5) on the passenger's side because of increased wear by the driver's feet.

As indicated in FIG. 6, the center panel 23 is separated from the side panels 21 and 22 by a relatively thin, flexible margin 46 which is smooth and unbroken by ribs. The presence of this margin 46 gives the floor mat greater flexibility at these points to allow the mat to fit the transmission hump more readily and lie smoothly along the floor without buckling or bridging the re-entrant areas where the sides of hump join the flat floor. Center panel 23 may be provided with a plurality of transverse ribs 47 which may be somewhat lower in height and closer in spacing than the transverse ribs on the side panels 21 and 22. The transverse ribs 47 are spaced apart by U-shaped grooves 48 and have flat top surfaces 49 parallel with the underside of the mat. Center panel 23 may also be provided with a center rib as indicated at 51 and a design panel indicated at 52 as desired for decorative purposes. The rib 51 and design panel 52 may be made of material of different colors formed either during molding or applied later, or panel 52 and rib 51 may be left out and the transverse ribs 47 continued unbroken for the full width of the center panel 23.

The side panels 21 and 22 are provided with thin flaps 55 and 56, as shown clearly in FIGS. 1 and 4, and these flaps extend laterally outwardly beyond the peripheral dam 31. Flaps 55 and 56 have a bottom surface co-extensive with the underside 28 of the rest of the mat and are made thinner than any of the floor portions within the peripheral dam 31. Flaps 55 and 56 have outer edges 57 and 58, respectively, which define the outer periphery of a floor mat which is at least as large as the floor area of the largest size automobile. Another pair of flaps 61 and 62 is provided on the inner edges of the forward portions 25 and 26 and define peripheral edges 63 and 64, respectively. As indicated at 65, a cutout is provided on flap 61 to provide for the hinge on the accelerator pedal, and the forward portion 25 on the left side panel is somewhat narrower than the forward portion 26 on the right panel to give pedal clearance. A cutout 66 is formed on the right hand flap 62 adjacent a re-entrant portion 67 of the peripheral dam 31. Since forward portion 26 and flap 62 extend over adjacent to center panel 23, the cutout 66 and re-entrant portion 67 allow the flap 62 to be folded upward and extend partially over the top of the transmission hump or tunnel without buckling or bridging the floor in this area. This arrangement insures that the mat will accommodate itself to the floor of automobiles having transmission humps of different heights and widths while maintaining a relatively close fit around the accelerator pedal.

The manner in which the floor mat of FIGS. 1 through 8 fits the floors of automobiles of different sizes is best seen in conjunction with FIGS. 9 through 13. In FIG. 9 the outline of the floor mat of the present invention is shown at 70 as super-imposed upon the floor mat designed expressly to fit a car of make A as shown in shaded outline at 71. It will be noticed that the flap portion 55 extends beyond the edge of the mat of car A while the remaining portions around the forward portion 25 correspond generally in outline so that mat 20 fits the floor of the automobile A fairly closely.

In FIG. 10 the outline of the present floor mat at 70 is slightly smaller than that of make B as indicated in the shaded outline at 72 along the flap portions 55, and is otherwise coincident with the outline at 72. Thus the present mat fits make B as well as the original carpeting even though the flap 55 is slightly smaller. However, the portion of the carpeting extending beyond the outline 70 is so small that the discrepancy is unnoticeable. FIGURE 11 likewise shows the comparative outline between the present mat 70 and that of a make C automobile as shown at 73 in shaded outline. The mat 70 is seen to extend beyond the outlines of mat 73 at three places, along the flap 55, along the rear edge 21a of the left side panel, and around the forward portion 25. The slight rearward extension along the rear edge 21a does not interfere since this portion extends under the front seat, and the projection along the flap portion 55 is treated in the manner described in greater detail hereinafter. The projecting parts of forward portion 25 can be bent slightly upward to lie along the firewall and since these parts are forward of the pedals, they do not interfere with the fit of the universal mat on the floor of car C.

FIG. 12 shows a relative fit between the universal mat 70 and a smaller size car D as indicated in the shaded outline at 75. It will be seen that the outline 75 corresponds almost exactly to the outer side of the peripheral dam 31 so that the flaps 55 and 61 are the only portions of the mat which extend beyond the outline of the mat fitted expressly for the car D.

From the foregoing, it will be seen that the universal mat of the present invention has a peripheral dam 31 of such a size that it lies substantially flat on the floor of both the small cars and large cars. However, in the case of a large car the peripheral dam 31 is spaced inwardly from the floor edges and covers an area substantially smaller than that of the mat fitting the car. However, the flaps 55, 56, 61 and 62 extend over the area to provide coverage over the portions of the larger automobiles which extend beyond the peripheral dam 31. When the mat is installed in a smaller automobile, such as the car of make D as shown in FIGURE 12, the flaps, being very thin and flexible, can be bent up along the side of the car as indicated in FIGURE 13, or else they can be very easily cut off and the mat trimmed back to the proper size outlined. As shown therein, the mat 20 is placed on the floor 77 so that the peripheral dam 31 lies flat on the floor. However, in most cars the floor is recessed below the sill 78. Since the floor 77 is spaced below the door opening 79, the flap 55 curves upward so that it extends substantially vertically along the side of sill 78 and terminates below the edge of the door opening 79. The presence of the flap 55 along this point serves as protection to the carpeting on the side of sill 78 against scuffing as well as against water and dirt, while the peripheral dam 31 still lies flat so that the water and dirt within the dam cannot spill over the edge.

The floor mat may be made from any of a variety of elastomeric materials such as natural rubber, synthetic rubber, and other flexible resilient synthetic materials. Depending upon the material used, the mat may be produced by casting, compression molding or injection molding. One method is to cast the mat from a vinyl plastisol in a female mold. This plastisol may be made from polyvinyl chloride resin mixed with a suitable plasticizer, stabilizer and pigments to give the desired color to the finished mat.

As shown in FIG. 14, the mold cavity is sunk into a plate 81 of suitable material, such as aluminum, so that the underside of the mat when poured will be substantially flush with the top surface 82 of the mold. The proper amount of liquid plastisol is placed in the mold cavity and spread or allowed to flow to completely fill the cavity from edge to edge, after which the mold, while maintained in a horizontal position, is placed in a suitable curing oven. After the curing is completed, the mold with the cured mat is removed from the oven for cooling. Since the fused plastisol is relatively soft and plastic at the high curing temperature before it is cooled, advantage may be taken of this fact to form the projections or buttons 29 on the underside 28 of the mat, which is now the exposed surface. These buttons may be formed by moving a roller shown at 83 across the exposed underside 28. The roller 83 is provided with a spaced array of indentations 84 and, the pressure of the roller on top of the soft plastisol causes the material to extrude upward and plastically deform to fill the indentations 84. As the roller is moved past the surface, the projections or buttons 29 formed by indentations 84 remain raised on the surface as the molded mat cools and hardens.

Instead of using the roller 83 the projections 29 may be formed by placing a flat plate having suitable indentations over the mold and pressing it downward to cause plastisol to fill the indentations. This plate may be used either after the mold has been removed from the oven or placed on top of the mold during curing in the oven. When the plate is used, it may also be employed to impress trim lines on the underside of the flap portions 55, 56, 61 and 62. These trim lines indicate where the flap portions should be cut in order to be flat on the floor of the cars B, C, and D without having the flap portions curve upward along the sill if the user does not wish to take advantage of this feature of the invention.

After the mold and mat have cooled to room temperature, the finished mat 20 may be peeled out of the mold which is then available for reuse. The degree of softness and flexibility of the finished mat depend upon the type of material used, but the mat should be soft and flexible enough to conform readily to the contours of the automobile floor without any noticeable tendency to bridge over sharp curves but still maintain sufficient toughness and resilience to resist tearing and abrasive wear.

It is also contemplated that the present invention can be incorporated into a floor mat for the rear seat of an automobile. The mat would be flat on the floor with the peripheral dam following the floor outline of a small size automobile. Flaps extending outward from the outer edge of the dam would be provided along the edges of the mat for use in automobiles having a larger floor area in a manner similar to the front floor mat described above.

Although the shape and structure of the floor mat together with a preferred method of manufacture has been described and shown in detail, it is not intended that these details shall be limitations upon the scope of the invention, and various modifications and rearrangements may be made by those skilled in the art without departing from the scope of the invention as defined in the appended claims.

What is claimed is:

1. A flexible one-piece automobile floor mat composed of an elastomeric material and adapted to fit on top of the original floor covering on the front floor of an automobile, comprising a center section adapted to fit over the transmission hump and a pair of side sections adapted to lie on the floor on each side of the hump, each of said side sections having a forward portion extending beyond the front edge of said center section to lie along the inclined toe board portion of the floor, said mat having a substantially flat under surface, a peripheral dam projecting above the upper surface and extending unbrokenly around the periphery of said center and side sections, a thin flexible flap portion along the outer edge of each side section extending outwardly beyond said peripheral dam and having a thickness substantially less than that of said dam, the portion of the mat within said peripheral dam having a thickness substantially less than that of said dam and greater than that of said flap portions, a plurality of ribs extending transversely across said side sections and projecting above the upper surface of said mat, said ribs being spaced away from said peripheral dam along the outer edges by a margin portion having a substantially smooth upper surface, said margin portion being substantially thinner than said ribs.

2. A flexible one-piece automobile floor mat as set forth in claim 1 in which the top surface of said transverse ribs slopes downwardly and forwardly toward the front of the mat.

3. A flexible one-piece automobile floor mat as set forth in claim 1 wherein said center section is provided with upwardly projecting transverse ribs, said mat having smooth thin flexible margins interspacing the center section and the two side sections.

4. A flexible one-piece automobile floor mat to fit on top of the original floor covering on the front floor of any one of a number of different automobiles, said mat being composed of an elastomeric material and comprising a center section adapted to fit over transmission humps of different heights and widths and a pair of side sections adapted to lie on the floor on opposite sides of said humps, each of said side sections having a forward portion extending beyond the front edge of said center section to lie along the inclined toe board of the floor, a peripheral dam projecting above the upper surface and extending unbrokenly around the periphery of said center and side sections, a thin flexible flap portion along the outer edge of each side section extending outwardly beyond said peripheral dam from the bottom portion thereof and having a uniform thickness substantially less than that of said dam to lie on and conform to the outer floor portions of the one of said automobiles having the greatest linear extent measured from side-to-side and over the transmission hump, said flap portions being adapted to be bent upwardly along the side walls at the outer edges of the floors of those said automobiles having a lesser linear extent from side-to-side and over the transmission hump, said flaps being sufficiently thin and flexible to lie against said side walls without lifting said side sections of the mat from the floor.

5. A flexible one-piece automobile floor mat as set forth in claim 4 having a thin flexible inner flap portion of substantially uniform thickness extending inwardly from the inner edge of each of said forward portions and being sufficiently thin and flexible to be bent upward to lie against the transmission hump without lifting said side sections of the mat from the floor.

References Cited in the file of this patent

UNITED STATES PATENTS

| | | |
|---|---|---|
| 1,216,077 | Cohen et al. | Feb. 13, 1917 |
| 1,883,737 | Duffy | Oct. 18, 1932 |
| 2,032,832 | Blair et al. | Mar. 3, 1936 |
| 2,505,554 | Kravitz | Apr. 25, 1950 |
| 2,650,855 | Pierce | Sept. 1, 1953 |
| 2,793,149 | Richter | May 21, 1957 |
| 2,897,963 | Byers | Aug. 4, 1959 |
| 2,909,234 | Belk | Oct. 20, 1959 |
| 3,052,314 | McBride | Sept. 4, 1962 |

FOREIGN PATENTS

| | | |
|---|---|---|
| 722,551 | Great Britain | Jan. 26, 1955 |

OTHER REFERENCES

Publication, "Krestliner Kar-Rug," of Rubbermaid, Inc., Wooster, Ohio, 1 sheet.

Publication, "Voyager Protector Floor Mats," of Anchor Rubber Products, Cleveland 12, Ohio, page 5.